(12) United States Patent
Terrill et al.

(10) Patent No.: US 9,344,459 B2
(45) Date of Patent: May 17, 2016

(54) TELECOMMUNICATION SYSTEM AND METHOD OF COMMUNICATING PROTOCOL INFORMATION

(71) Applicant: TELEFONAKTIEBOLAGET L M ERICSSON (PUBL), Stockholm (SE)

(72) Inventors: Stephen Terrill, Madrid (ES); Thian Joo Tan, Victoria (AU); Glenn Douglas McPherson, Sydney (AU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 384 days.

(21) Appl. No.: 13/861,987

(22) Filed: Apr. 12, 2013

(65) Prior Publication Data
US 2013/0275603 A1 Oct. 17, 2013

Related U.S. Application Data

(63) Continuation of application No. 10/332,716, filed as application No. PCT/AU01/00865 on Jul. 17, 2001, now abandoned.

(30) Foreign Application Priority Data

Jul. 18, 2000 (AU) .................................... PQ8832

(51) Int. Cl.
H04L 12/28 (2006.01)
H04L 29/06 (2006.01)
H04W 28/06 (2009.01)
H04W 74/00 (2009.01)

(52) U.S. Cl.
CPC ............ *H04L 65/1006* (2013.01); *H04L 69/04* (2013.01); *H04L 69/22* (2013.01); *H04W 28/06* (2013.01); *H04L 29/06027* (2013.01); *H04L 65/1016* (2013.01); *H04W 74/00* (2013.01)

(58) Field of Classification Search
None
See application file for complete search history.

(56) References Cited

U.S. PATENT DOCUMENTS

| 5,793,744 | A | 8/1998 | Kanerva et al. | |
|---|---|---|---|---|
| 5,881,105 | A | 3/1999 | Balachandran et al. | |
| 5,896,382 | A | 4/1999 | Davis et al. | |
| 6,032,197 | A | 2/2000 | Moran et al. | |
| 6,237,041 | B1 * | 5/2001 | Håål et al. ............... | H04L 29/06 709/203 |
| 6,247,062 | B1 * | 6/2001 | Sarkar ..................... | H04L 45/00 370/409 |
| 6,408,342 | B1 * | 6/2002 | Moore .................... | G06F 9/547 719/315 |

(Continued)

FOREIGN PATENT DOCUMENTS

| WO | WO 99/04582 A1 | 1/1999 |
|---|---|---|
| WO | WO 99/33291 A1 | 7/1999 |

OTHER PUBLICATIONS

Degermark, et al. RFC 2507: IP header Compression. Feb. 1999.

(Continued)

*Primary Examiner* — Mounir Moutaouakil

(57) ABSTRACT

The present invention applies to telecommunication networks, such as wireless mobile networks. In particular, the present invention deals with providing more efficient use of the resources of such mobile networks. The present invention provides in a wireless mobile telecommunications network, having a wireless mobile access interface, a message filter function adapted to remove, store and/or adapt header information from messages transferred to/from a wireless mobile device. The present invention is based on using the SIP signalling channel within the workings of a mobile network system more efficiently.

9 Claims, 8 Drawing Sheets

(56) References Cited

U.S. PATENT DOCUMENTS

Figure 1:
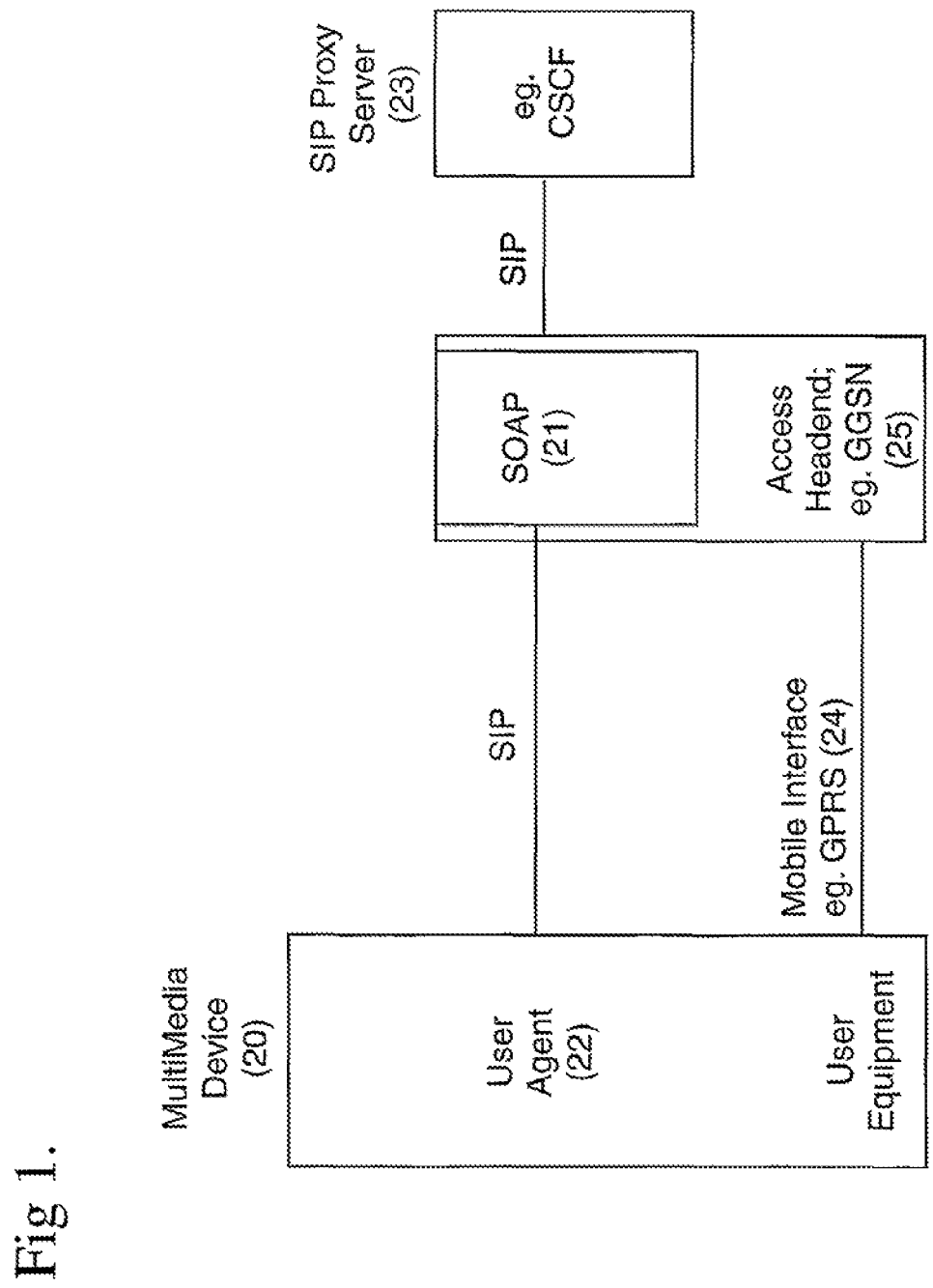

| | | | |
|---|---|---|---|
| 6,430,197 B1 * | 8/2002 | Park | H04J 3/247 370/471 |
| 6,446,127 B1 * | 9/2002 | Schuster | G06F 1/1632 709/227 |
| 6,463,064 B1 * | 10/2002 | Broockman | H04L 12/4604 370/401 |
| 6,484,197 B1 | 11/2002 | Donohue | |
| 6,577,622 B1 | 6/2003 | Schuster et al. | |
| 6,658,095 B1 | 12/2003 | Yoakum et al. | |
| 6,678,735 B1 | 1/2004 | Orton et al. | |
| 6,681,252 B1 | 1/2004 | Schuster et al. | |
| 6,795,427 B1 | 9/2004 | Klein et al. | |

OTHER PUBLICATIONS

Svanboro, et al. Wireless Real-Time IP Services Enabled by Header Compression. VTC 2000—Spring. 2000 IEEE 51$^{st}$ Vehicular Technology Conference Proceedings. Tokyo, Japan. May 15-18, 2000. IEEE vol. 2 of 3, Conf 51. May 2000, pp. 1150-1154.

Handley, et al. RCE 2543 SIP: Session Initiation Protocol. Network Working Group. Mar. 1999.

* cited by examiner

Fig 6.

SOAP AT UA CLIENT SIDE

- INVITE F1
  - Via <UAC>

- 200 F4
  - Via <UAC>
  - Record-Route <SOAP>

- BYE F5
  - Via <UAC>
  - Route <SOAP>,<UAS CONTACT>

- INVITE F2
  - Via <UAC>

- 200 F3
  - Via <UAC>
  - Record-Route <P1>,<P2>

- BYE F6
  - Via <UAC>
  - Route <P1>, <P2>,<UAS CONTACT>

SOAP AT UA SERVER SIDE

- INVITE F1
  - Via <UAC>
  - Via <P1>
  - Via <P2>
  - Record-Route <P1>, <P2>

- <Response> F4
  - Via <P2>
  - Via <P1>
  - Via <UAC>
  - Record-Route<P1>, <P2>

- 200 F6
  - Via <P2>
  - Via <P1>
  - Via <UAC>
  - Record-Route <P1>, <P2>

- INVITE F2
  - Via <SOAP>
  - Record-Route <SOAP>

- <Response> F3
  - Via <SOAP>
  - Record-Route<SOAP>

- 200 F5
  - Via <SOAP>
  - Record-Route <SOAP>

Fig 8.

TELECOMMUNICATION SYSTEM AND METHOD OF COMMUNICATING PROTOCOL INFORMATION

RELATED APPLICATIONS

This application is a continuation of co-pending U.S. patent application Ser. No. 10/332,716 filed Jan. 13, 2003, which is a 371 of International Application No. PCT/AU01/00865, filed Jul. 7, 2001, which claims the benefit of AU PQ 8832 filed Jul. 18, 2000, the disclosures of which are fully incorporated herein by reference.

FIELD OF INVENTION

The present invention applies to telecommunication networks, such as wireless mobile networks. In particular, the present invention deals with providing more efficient use of the resources of such mobile networks.

BACKGROUND ART

SIP is an application-layer control protocol that can establish, modify and terminate multimedia sessions or calls. SIP has been gaining in popularity and is considered likely to be the protocol of preference for application layer control of multimedia and IP telephony services, and is indeed the protocol considered to be selected to be used within 3GPP for multimedia sessions over IP to the terminal.

The current developments of SIP, however, are mainly over wireline systems where the length of the SIP messages has not been an important issue.

SIP is a text-based protocol that has great flexibility and is easy to understand. However, particularly in the application to mobile networks, the SIP messages have to carry information about the SIP proxy servers which are involved in the call session, as well as, information about those SIP proxy servers that may wish to be involved in the rest of the call session also. This can result in considerable header information being carried with each SIP message.

It is considered desirable that the session control protocol should not have lengthy messages. When SIP is applied on a wireless mobile interface, which is considered to be a relatively expensive resource, the length of the SIP messages are therefore considered unacceptable and an inefficient utilisation of a very expensive resource.

Furthermore, wireless mobile interfaces are considered to have relatively high error rates and unnecessarily lengthy messages such as the prior art SIP messages rioted above are considered more susceptible to corruption by virtue of their length.

Unfortunately, the SIP messages of the prior art, which are already considered to be quite lengthy, may grow even longer as more functionality is developed for SIP.

The present invention seeks as an object to alleviate at least one problem associated with the prior art.

Statements regarding the prior art throughout this specification are not to be taken as an admission of the state of common general knowledge in Australia in the field of the invention at the priority date of this application.

SUMMARY OF INVENTION

The present invention provides in a wireless mobile telecommunications network, having a wireless mobile access interface, a message filter function adapted to remove, store and/or adapt header information from messages transferred to/from a wireless mobile device. Henceforth, the term "filter" shall refer to a function which may remove, store and/or adapt.

The present invention also provides a method of communicating messages between a wireless mobile device and a message source/destination, in which the method includes filtering header information from messages destined to the mobile device, and adapting header information to messages emanating from the mobile device.

Preferably, the messages are SIP messages.

A telecommunications network, including the message filter function as noted above is also disclosed.

The present invention is based on using the SIP signalling channel within the workings of a mobile network system more efficiently. In effect, the present invention will filter header information prior to sending the SIP message to the wireless mobile device. The present invention can be put into effect by a SIP on air proxy (SOAP) function. A list of proxy server identifiers are replaced by the identifier for a SOAP proxy server. Functional information which are not supported by the User Agent are filtered by the SOAP function. The effect is shorter messages which, thus, provides a reduction in the radio resource utilisation and a corresponding increase in throughput.

Preferably, the SOAP function resides either at a SIP Proxy Server or between the SIP User Agent and the SIP Proxy Server. On a session basis, the SOAP function filters the header information from the SIP messages sent by the SIP Proxy Server and stores them. In this way, for example, only the header information required by the application layer is sent over the wireless mobile interface to a User Agent such as that present at a mobile device node. The filtered header information may then be adapted to messages sent in the reverse direction from the mobile client to the server side. The SIP on air Proxy (SOAP) function, according to the present invention, is configured to handle header information in accordance with predetermined criteria.

Mobile device includes, without limitation, at least a mobile wireless telephone, personal digital assistant PDA, or generally, user equipment UE.

Figure 2:
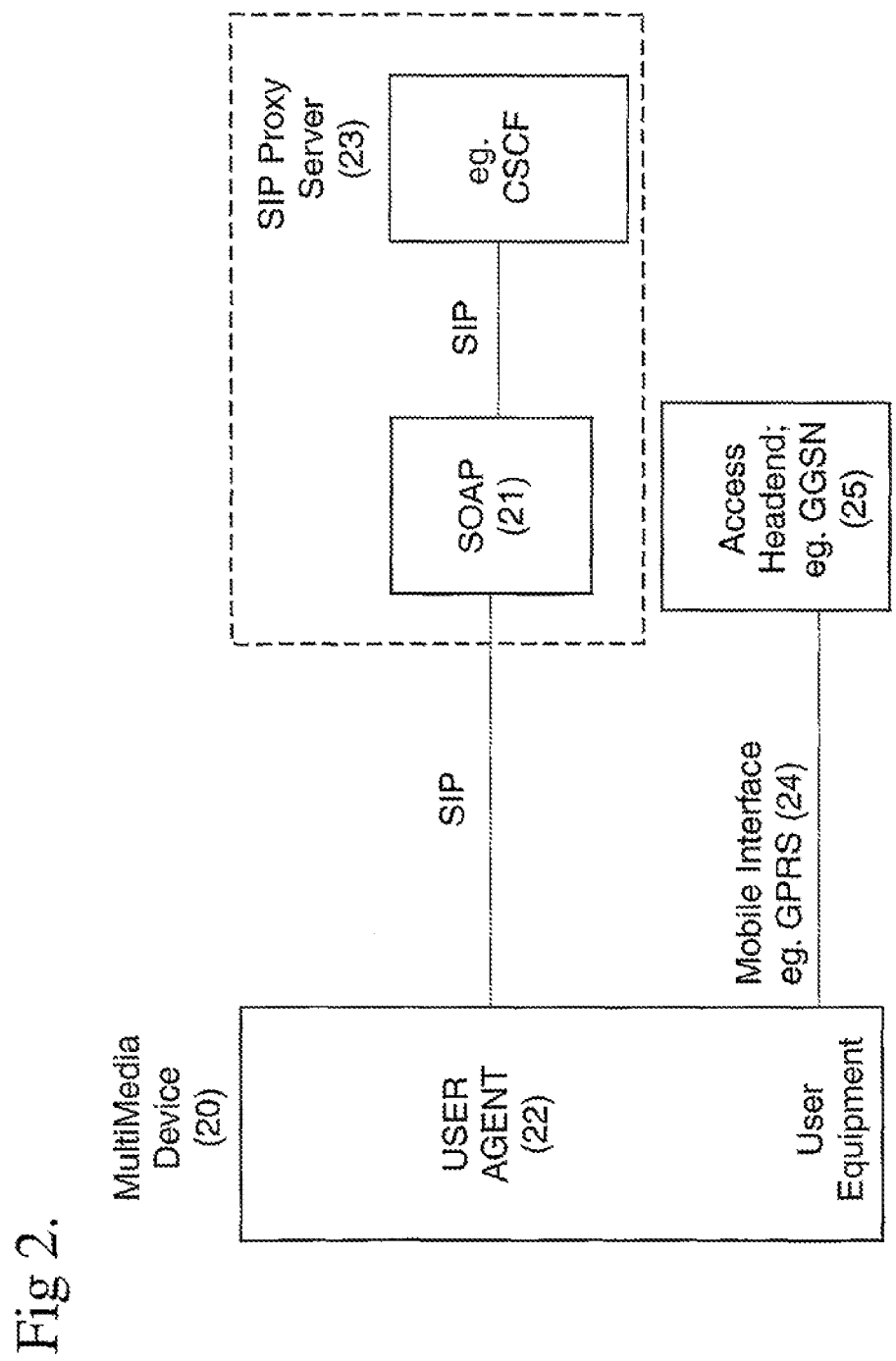
Figure 3:
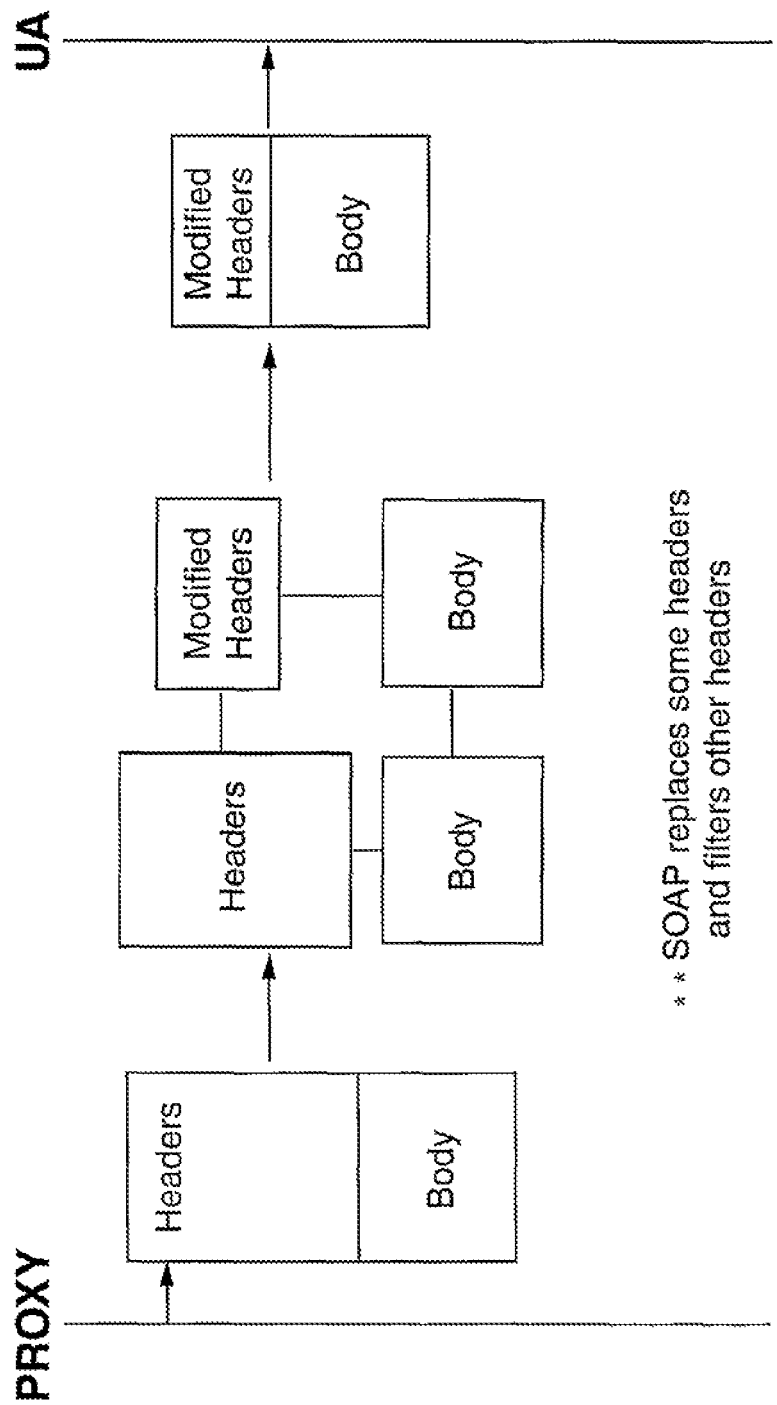
Figure 4:
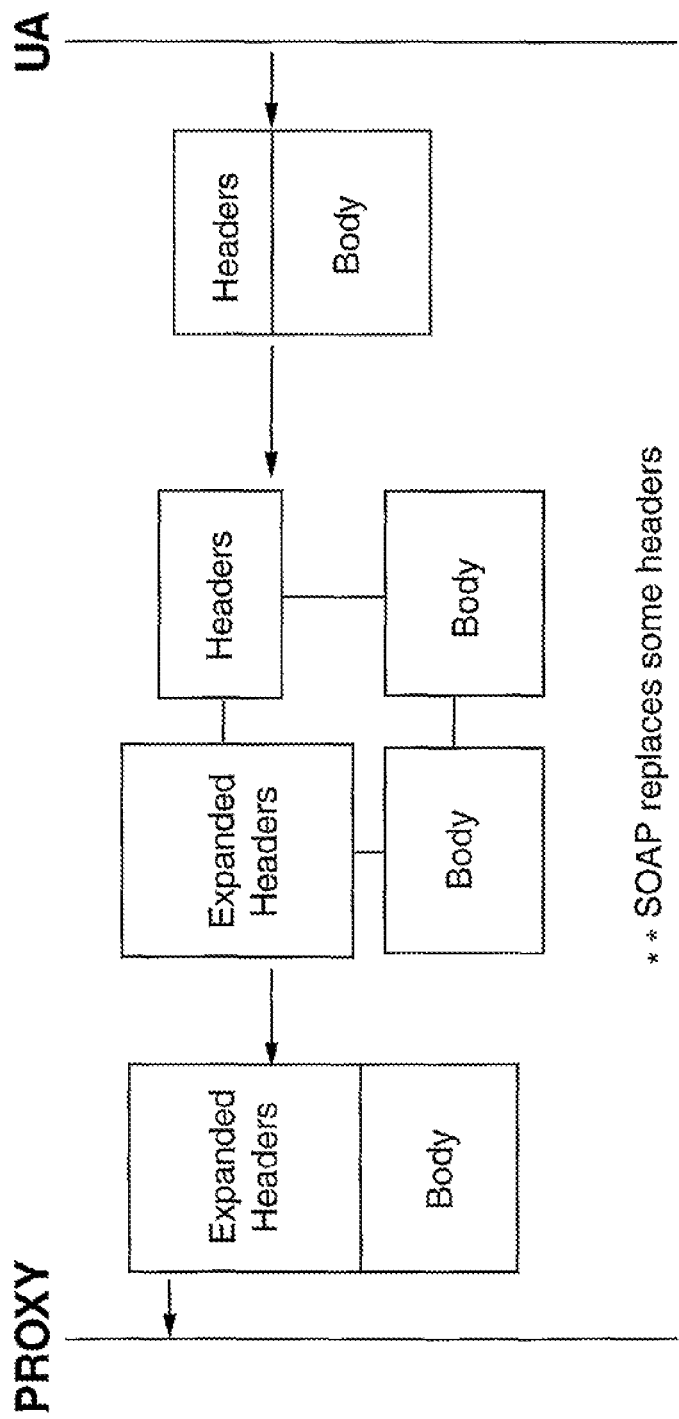
Figure 5:
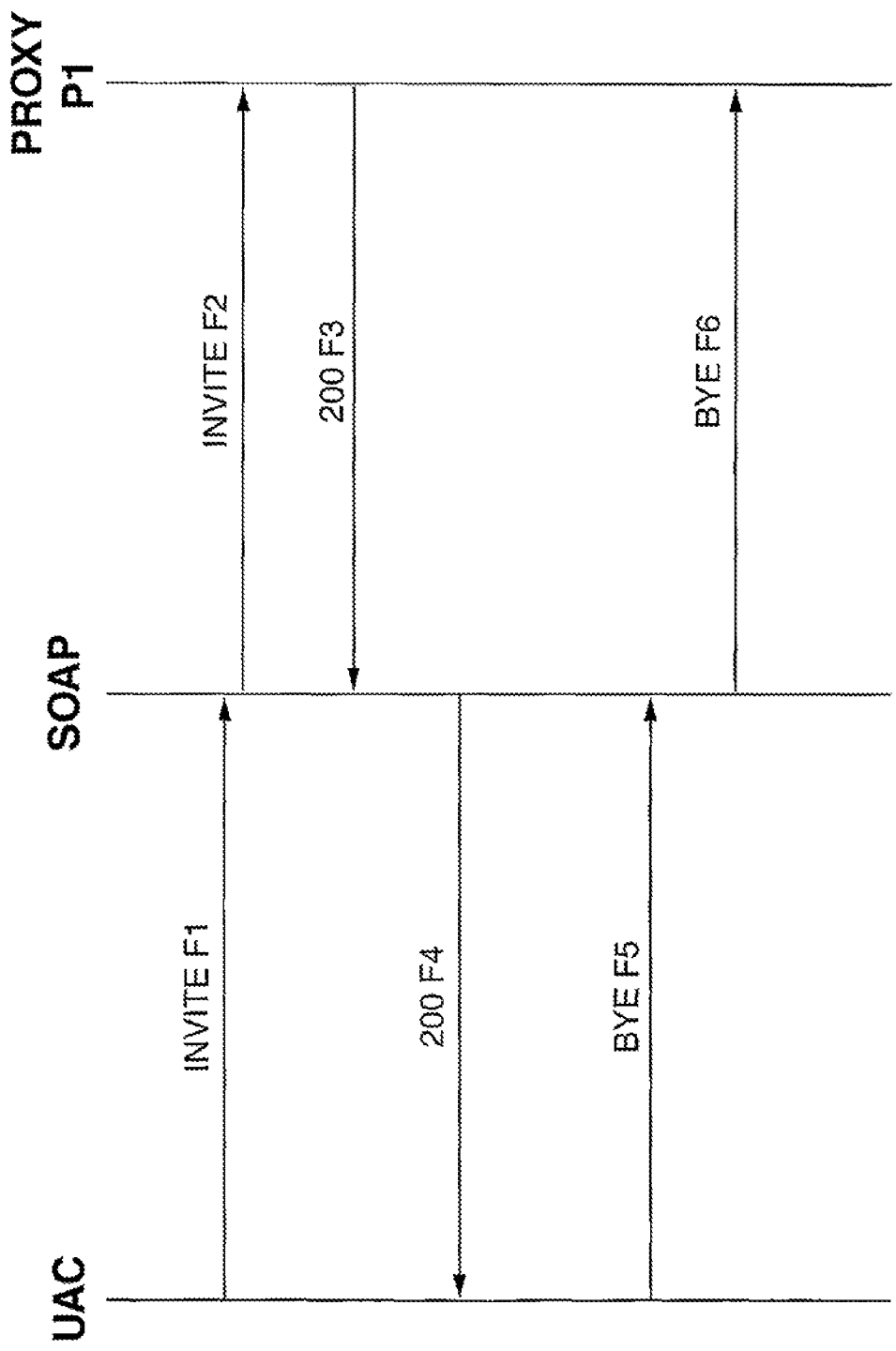
Figure 7:
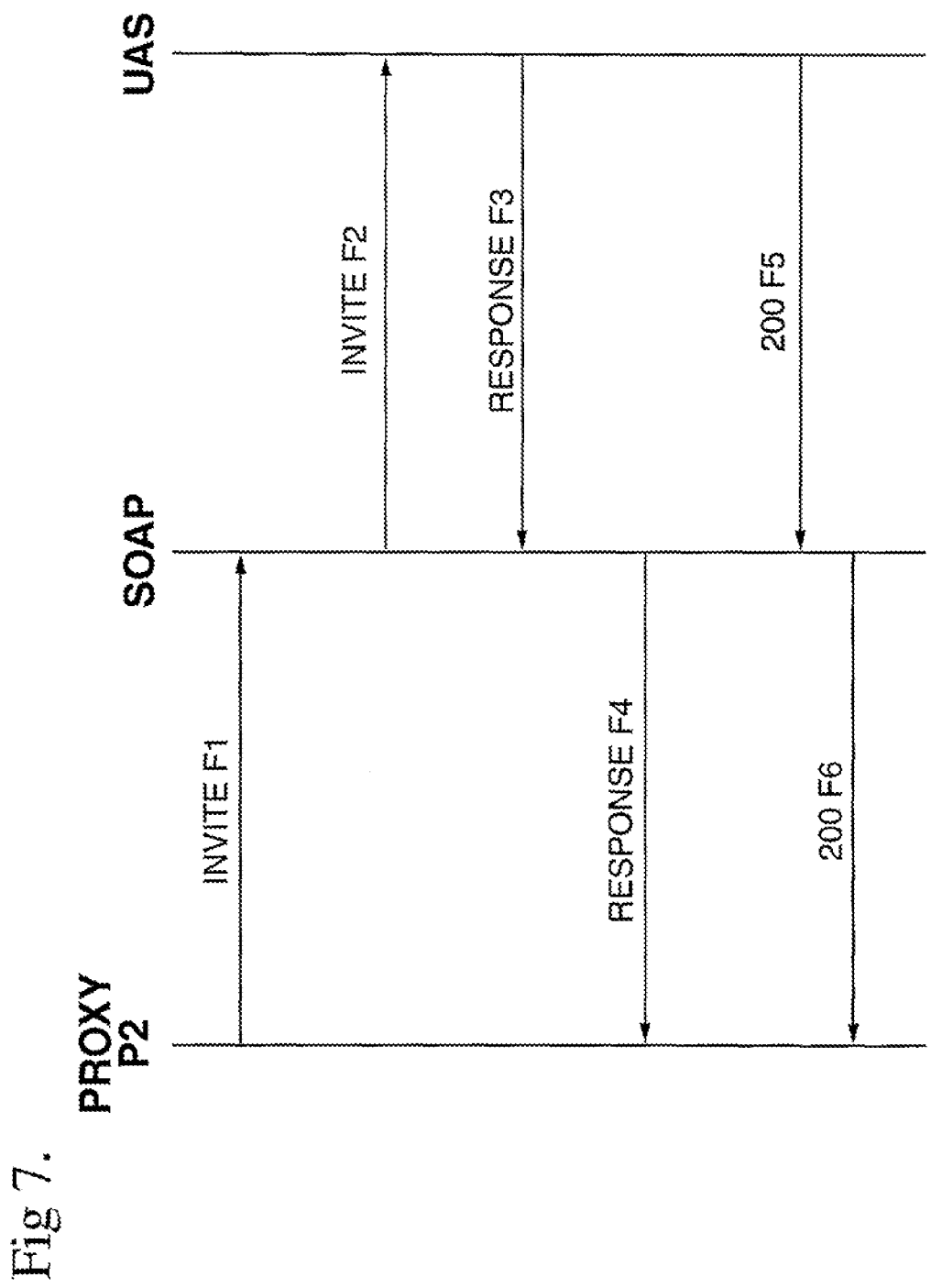

A preferred embodiment of the present invention will now be described with reference to the accompanying drawings, in which:

FIG. 1 illustrates schematically, a portion of a communication network including a wireless mobile access interface logically having a SOAP filter function according to one embodiment of the present invention, FIG. 2 illustrates schematically, a portion of a communication network including a wireless mobile access interlace logically having a SOAP filter function according to another embodiment of the present invention. The SOAP function in this embodiment may be co-located within a SIP Proxy Server, FIG. 3 illustrates schematically a view of the operation (in-part) of the present invention for messages communicated from a SIP Proxy Server to a SIP User Agent, and FIG. 4 illustrates schematically a view of the operation (in-part) of the present invention for messages communicated from a SIP User Agent to a SIP Proxy Server, FIG. 5 illustrates the communication relating to the present invention for the client side, FIG. 6 gives an example (only) of headers contained in each message of FIG. 6, FIG. 7 illustrates the communication relating to the present invention for the server side, and FIG. 8 gives an example (only) of headers contained in each message of FIG. 7.

As seen in FIGS. 1 and 2 for example, the solution proposed, in this invention is to have a SIP on air Proxy (SOAP) function 21. The SOAP function 21 resides between the SIP User Agent 22 and the SIP Proxy Server 23. Referring to FIGS. 3 and 4, on a session basis, the SOAP function 21 filters header information 11 residing within, for example, the application layer information from the SIP messages 10 sent by the SIP Proxy Server 23 and stores this information. The header information may then be modified in accordance with predetermined criteria for transmission to a User Agent. For instance a given proxy server identifier(s) is/are replaced with the SOAP server identifier. In this way, only the user agent related header information required by the application layer, for example, is sent over the wireless mobile interface 24.

The filtered, or similar, header information 11, specific to the particular session, may then be added to messages 10 sent in the reverse direction.

This stored header information may also be added for future messages associated with the same session.
Header information 11 includes, but is not limited to, the following:
 Via
 Record Route
 Route (which is generated by SOAP based on Record Route stored)
 Warning (may be filtered for simple terminals which do not use this information)
 Organization (may be filtered, screening function may be in the SOAP server)
 Request-URI (may be filtered for simple terminals)
 Other similar information.

The SOAP function 21 can be logically resident in the head-end of the wireless mobile access interface 25, although it can reside anywhere between the mobile device and message source/destination. For GPRS and UMTS packet mode service, the SOAP function 21 can be co-located with the GGSN or can be separate from the GGSN. These alternatives are illustrated in FIGS. 1 and 2 respectively.

Advantageously, it has been found that the present invention will significantly reduce the wireless mobile resources required by the call/session control for establishing multimedia/telephony call sessions using SIP. The wireless mobile device 20 will also have reduced processor load and memory usage with the elimination of extraneous information carried over the radio or wireless interface 24. One implementation is considered to reside in the 3GPP IP Multimedia Subsystem.

A number of examples of an implementation of the present invention is now disclosed. It is to be noted that the present invention should not be limited to these examples only.

EXAMPLE 1

Handling of Record Route and Route Headers at the Client Side

FIGS. 5 and 6 illustrate the SOAP function 21 at the client side. The SOAP function 21 resides between the UAC 22 and a SIP Proxy Server 23. The SIP messages are identified as F1 to F6. FIG. 6 identifies the relevant headers contained in each message.

The SOAP function 21 stores the Record Route header (ie <P1>, <P2>) in the 200 F3 message and replaces it with its own address identifier (ie <SOAP>) in 200 F4.

When the UAC 22 subsequently sends a message, say a BYE F5, the Route header (<SOAP>,<UAS contact>) is replaced with (<P1>,<P2>,<UAS contact>) in BYE F6.

EXAMPLE 2

Handling of Via, Record Route and Route Headers at the Server Side

FIGS. 7 and 8 illustrate the SOAP function 21 at the server side. The SOAP function resides between the UAS 22 and a SIP Proxy Server 23. The SIP messages are identified as F1 to F6. FIG. 8 identifies the relevant headers contained in each message.

The SOAP function 21 stores the Record Route header (<P1>, <P2>) and Via headers (Via <UAG>, Via <P1>, Via <P2>) in the INVITE F1 message and replaces them with its own address identifier (ie Via <SOAP> and Record Route <SOAP>) in INVITE F2.

When the UAS 22 subsequently sends The <Response> F3 or 200 F5 message, the SOAP function 21 replaces the Via and/or Record Route header (<SOAP>) with the stored Via and Record Route headers in <Response> F4 and 200 F6.

EXAMPLE 3

Simple Terminals and Terminals with Limited Display Capabilities

For relatively simple terminals and terminals with limited display capabilities, there are headers or parts of headers which can be filtered. The SOAP function 21 may, for example, filter the Warning header or just filter the warn-text in the Warning header. Other headers such as Organization and Request-URI may also be filtered where it is determined that the terminal is incapable of utilising this information and would have discarded them anyway.

The claims defining the invention are as follows:

1. A wireless telecommunications network node for establishing multimedia sessions with a wireless mobile device, the wireless telecommunications network node comprising:
 a SIP on air proxy (SOAP) server including a SIP message filter that is adapted to:
  remove selected header information from a SIP message addressed to the wireless mobile device;
  store the removed header information;
  replace the removed header information with modified header information; and
  add the stored header information to subsequent SIP messages received from the wireless mobile device,
 wherein the SIP message filter is further adapted to remove header information from the SIP message that is determined to be incapable of being utilized by the wireless mobile device, and
 wherein the header information that is determined to be incapable of being utilized by the wireless mobile device includes at least one of an organization header, a request-URI header, and at least a portion of a warning header.

2. The wireless telecommunications network node of claim 1, wherein the wireless telecommunications network node is separate from a wireless access head-end.

3. The wireless telecommunications network node of claim 1, wherein the wireless telecommunications network node includes a wireless access head-end.

4. The wireless telecommunications network node of claim 1, wherein the SIP message filter resides between the wireless mobile device and a SIP Proxy Server.

5. The wireless telecommunications network node of claim 1, wherein the header information, which the SIP message filter is adapted to remove includes a plurality of proxy server identifiers, and wherein the modified header information with which the SIP message filter is adapted to replace the plurality of proxy server identifiers includes an identifier corresponding to the SOAP server.

6. A method of communicating messages between a wireless mobile device and a wireless telecommunications network node, the method including the steps of:
   removing selected header information from a SIP message addressed to the wireless mobile device;
   storing the removed header information;
   replacing the removed header information with modified header information to reduce a length of the SIP message; and
   adding the stored header information to subsequent SIP messages received from the wireless mobile device; and
   removing header information from the SIP message that is determined to be incapable of being utilized by the wireless mobile device,
   wherein the header information that is determined to be incapable of being utilized by the wireless mobile device includes at least one of an organization header, a request-URI header, and at least a portion of a warning header.

7. The method of claim 6, wherein the wireless telecommunications network node is separate from a wireless access head-end.

8. The method of claim 6, wherein the wireless telecommunications network node includes a wireless access head-end.

9. The method of claim 6, wherein removing the selected header information includes removing a plurality of proxy server identifiers, and
   wherein replacing the removed header information includes replacing the plurality of proxy server identifiers with an identifier corresponding to a SOAP server.

* * * * *

UNITED STATES PATENT AND TRADEMARK OFFICE
CERTIFICATE OF CORRECTION

PATENT NO. : 9,344,459 B2  
APPLICATION NO. : 13/861987  
DATED : May 17, 2016  
INVENTOR(S) : Terrill et al.

Page 1 of 1

It is certified that error appears in the above-identified patent and that said Letters Patent is hereby corrected as shown below:

In the specification,

In Column 1, Line 7, delete "of co-pending" and insert -- of --, therefor.

In Column 1, Line 8, delete "2003," and insert -- 2003, now abandoned, --, therefor.

In Column 1, Line 10, delete "Jul. 7, 2001," and insert -- Jul. 17, 2001, --, therefor.

In Column 1, Line 49, delete "rioted above" and insert -- noted above --, therefor.

In Column 2, Line 49, delete "access interlace" and insert -- access interface --, therefor.

In Column 2, Line 56, delete "Agent, and" and insert -- Agent, --, therefor.

In Column 3, Line 49, delete "is now" and insert -- are now --, therefor.

In Column 4, Line 12, delete "(Via <UAG>," and insert -- (Via <UAC>, --, therefor.

Signed and Sealed this  
Twenty-sixth Day of July, 2016

Michelle K. Lee  
*Director of the United States Patent and Trademark Office*